United States Patent Office 3,106,502
Patented Oct. 8, 1963

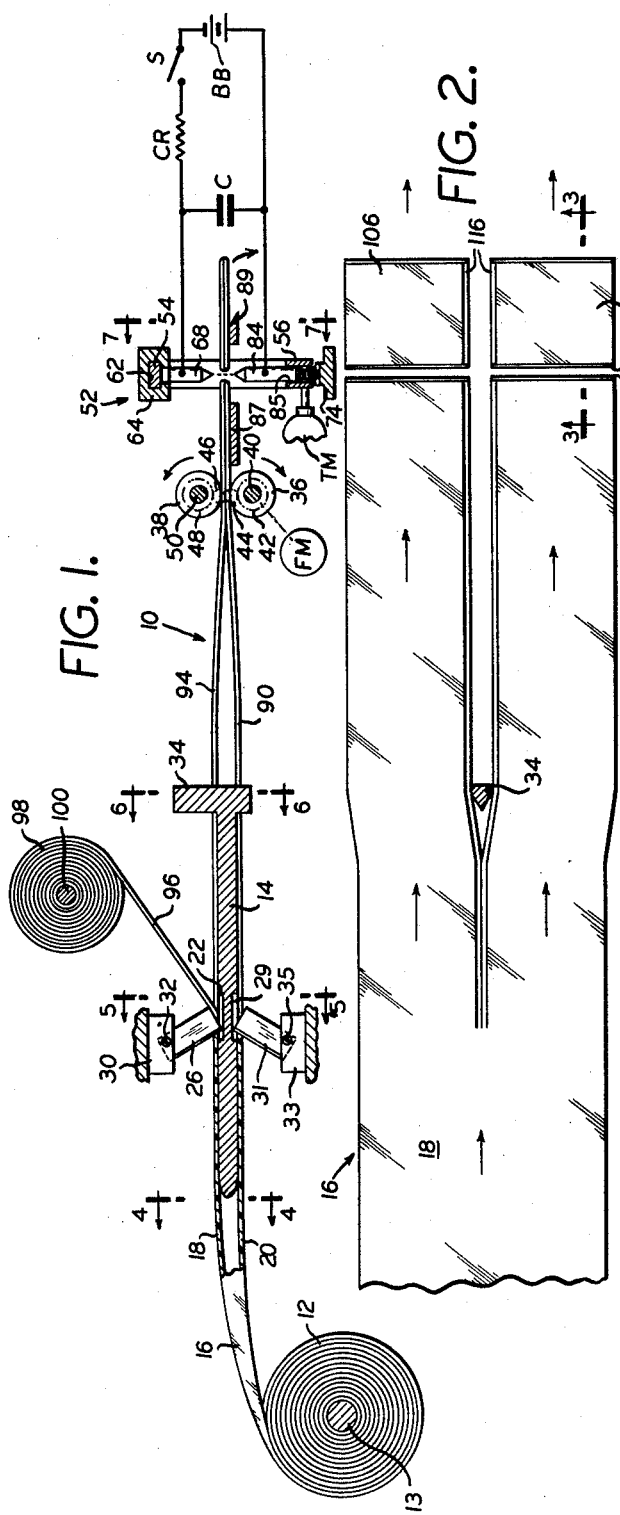

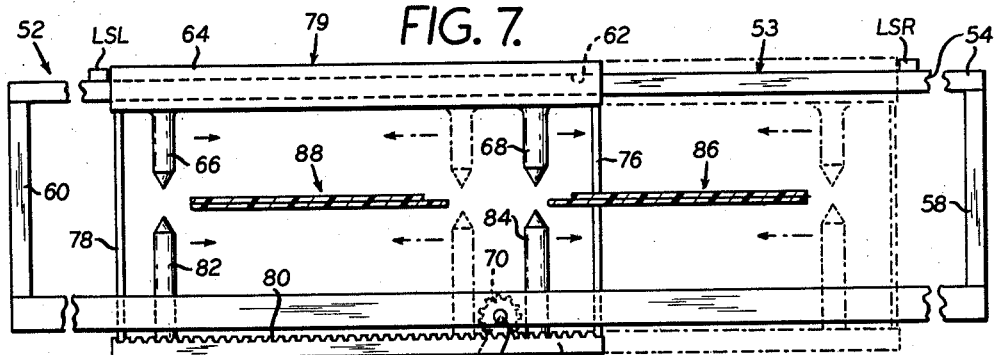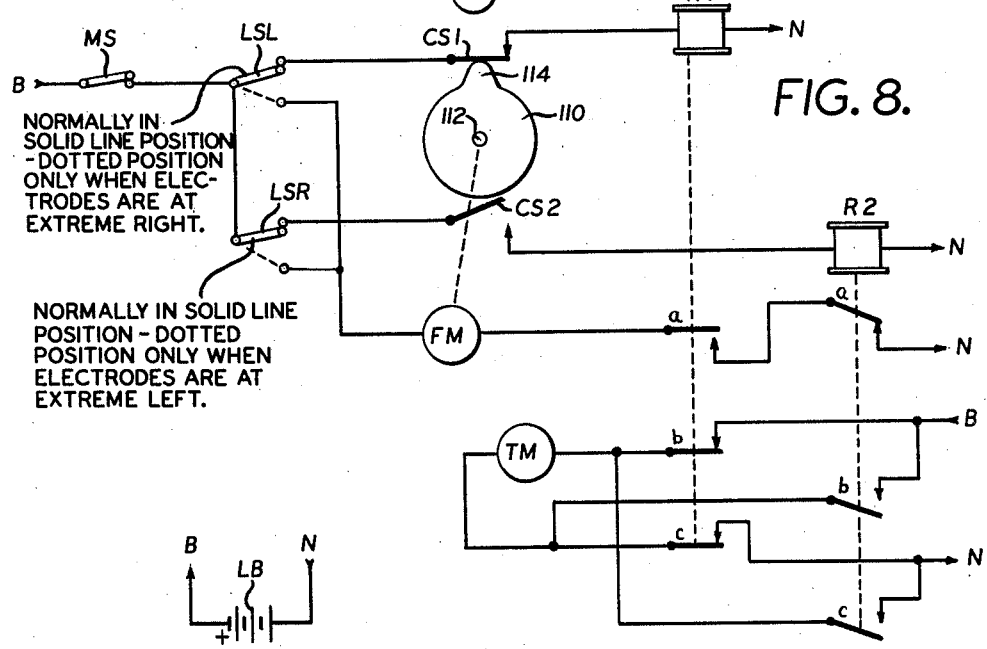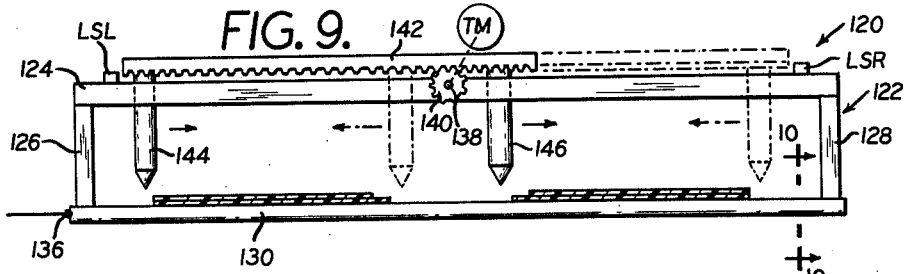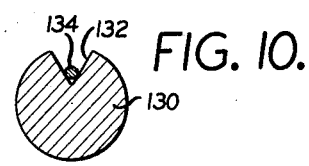

3,106,502
METHOD AND APPARATUS FOR CUTTING AND SEALING THERMOPLASTIC FILMS
Samuel L. Starger, Clark, Roland M. Levin, Linden, and Ivan J. Garshelis, Clark, N.J., assignors to Research Associates, Inc., Linden, N.J., a corporation of New York
Filed Aug. 21, 1959, Ser. No. 835,224
8 Claims. (Cl. 156—251)

This invention relates to a method and apparatus for sealing and cutting thermoplastic films.

This application is a continuation in part of our now abandoned earlier application Serial No. 745,595, filed by us on June 30, 1958, and assigned to the assignee hereof.

In recent years, there has been a great increase in the use of thermoplastic film or thin sheet as a packaging material. Among the film materials used most commonly are polyethylene, rubber hydrochloride, a filled vinyl polymer resin, polymerized vinyl chloride, heat sealing regenerated cellulose, and other suitable thermoplastic materials which can be made into thin sheet or films. The great increase in the use of these materials for packaging is due to the fact that the package can be made fluid-tight to thus enclose the packaged article to prevent the entrance or exit of moisture from the package. This fluid-tight feature is a result of the facts that thermoplastic film of the type under discussion is inherently moisture-tight, and in view of its thermoplastic nature, can be heat sealed to make a moisture-tight seam.

In view of these marked advantages of thermoplastic film over other packaging materials, there has been great activity in the art of heat sealing thermoplastic film material. To date, the heat sealing apparatus employed in the art has primarily relied upon heat generated from a high resistance electrical conductor when electric current is passed therethrough. Moreover, to date, to the best of our knowledge, all methods and apparatus for heat sealing require the application of substantial pressure during the application of heat in order to effect the seal. While the seal resulting from such prior art methods and apparatus is satisfactory from the viewpoint of obtaining a moisture-tight seal, very often the apparatus for cutting a sealed article must operate to leave an unsealed marginal portion or skirt, which is unsightly, and which results in a waste of material. Moreover, none of the apparatuses known in the prior art can simultaneously seal and cut thermoplastic film, the sealing being performed by a heated die and the cutting being performed by auxiliary apparatus such as a knife blade, or the like.

Moreover, in the prior art apparatuses presently employed, to heat seal thermoplastic materials, the electrical heating element is normally backed by pressure means generally made of good thermal conducting material such as aluminum. This combination inherently results in a substantial amount of the heat generated by the electrical heating element being conducted away from the thermoplastic films by the aluminum pressure means which results in a low overall efficiency.

The main object of the present invention is the provision of a novel method and apparatus for simultaneously cutting and sealing two superposed layers of thermoplastic film.

Another object of the present invention is the provision of an improved method for cutting a thermoplastic film.

A further object of the present invention is the provision of apparatus for simultaneously sealing and cutting two superposed layers of thermoplastic film, which apparatus is inexpensive to build and maintain, and is efficient in operation.

Another object of the present invention is the provision of a novel method for sealing and cutting two superposed thermoplastic films along a given path by passing a multiplicity of closely spaced electric sparks closely adjacent said path and then advancing said sparks along said path.

A yet further object of the present invention is the provision of a novel method of simultaneously sealing and cutting superposed pairs of thermoplastic film along a given path by passing an electric arc closely adjacent one end of said path and then advancing said arc along said path.

Still another object of the present invention is the provision of apparatus for simultaneously sealing and cutting two superposed thermoplastic films, which apparatus includes spaced electrodes and apparatus adapted to pass an electrical discharge between said spaced electrodes.

The above an other objects, characteristics and features of the present invention will be more fully understood from the following description taken in connection with the accompanying illustrative drawings.

In the drawings:

FIG. 1 is a diagrammatic longitudinal vertical sectional view of apparatus for forming bags of thermoplastic film, which apparatus embodies the present invention;

FIG. 2 is a plan view of an extruded tube of thermoplastic film as it passes through the apparatus shown in FIG. 1;

FIG. 3 is a sectional view taken along the line 3—3 in FIG. 2;

FIG. 4 is a sectional view taken along the line 4—4 in FIG. 1;

FIG. 5 is a sectional view taken along the line 5—5 in FIG. 1;

FIG. 6 is a sectional view taken along the line 6—6 in FIG. 1;

FIG. 7 is a sectional view taken along the line 7—7 in FIG. 1 and illustrating one form of sealing and cutting means embodying the present invention;

FIG. 8 is a schematic circuit diagram of the electrical control system employed in the machine shown in FIG. 1.

FIG. 9 is a view similar to FIG. 7 illustrating another form of sealing and cutting apparatus embodying the present invention; and FIG. 10 is a sectional view taken along the line 10—10 in FIG. 9.

*The Method*

We have discovered that if an electrical discharge is passed close to the edges of superposed layers of thermoplastic film such as polyethylene, the electrical discharge is effective not only to sufficiently heat the superposed films to cause a fusing and hence a sealing therebetween, but is further effective to cause a separation of the thermoplastic film adjacent the line of passage of the electrical discharge. Accordingly, if the electrical discharge is moved relative to the film, it will cause a separation of the film along the path of movement of the discharge and immediately in advance of the discharge there will be a sealed seam on each side of the line of separation. The seam is precisely at the extreme edge defined by the path of the electrical discharge, and hence, there is absolutely no waste of the thermoplastic film material. This discovery forms the basis of the present invention. Its advantages are manifold. Among them is the fact that no pressure need be applied to the thermoplastic film in order to effect the seal. While it has not been definitely established why the absence of pressure has no deleterious effect in practicing the present invention, it is believed that the force of the ions in the electrical discharge exerts a pressure against the thermoplastic film and thus holds the superposed layers together during the time that the heat of the electrical discharge is effective in rendering the film plastic in order to cause a fusion of the two superposed layers at the seam.

It is presently preferred in practicing our method, to use as the electrical discharge a spark, although an arc is satisfactory in practicing the invention. As is well known to those skilled in the art, a spark is a pulsating discharge, whereas an arc is a continuous discharge. In practicing the invention in the preferred form, wherein a spark is used, in order to get a continuous seam, a large multiplicity of closely spaced sparks is discharged between electrodes in very close time sequence, and to the eye the sparks appear to be continuous. The spark follows the straightest path between two spaced electrodes and thus automatically controls itself without the need of any auxiliary apparatus. This is the major reason for a preference for a spark over an arc type of electrical discharge. When an arc is used, the arc tends to elongate and hence blows itself out. In elongating the arc path between the electrodes between which the arc travels, the arc has a tendency to wander, and hence yield an irregular seam. However, this can be controlled by blowing air on the arc which tends to confine it to a substantially straight path between electrodes.

In practicing our method, two superposed layers of thermoplastic film which may actually be the two sides of a flaccid thermoplastic tube which has been flattened such as, for instance, a flattened extruded polyethylene, are disposed between two electrodes but laterally thereof. The electrodes are energized to cause an electrical discharge to pass therebetween; preferably this discharge being a series of sparks. As soon as the sparks start passing between the electrodes, a relative movement between the electrodes on the one hand, and the superposed thermoplastic films on the other, is effected. Generally, although not necessarily, this movement will be lateral of the longitudinal axis of the thermoplastic films and will move fully across the surface of the superposed thermoplastic films. When the movement is completed, the superposed thermoplastic films will have been divided along the path of movement and a moisture-tight seal will be defined on both portions adjacent said path of movement. Thereafter, the spark may be discontinued, the thermoplastic film may be advanced for an additional cut, and the electrodes moved back relative to the film in the opposite direction to make the next cut and pair of seams. In practicing the method described above, it is extremely important that the electrodes do not come into direct engagement with either of the superposed thermoplastic films, a spacing being required to prevent sticking between the electrodes on the one hand and the thermoplastic material on the other.

While the method described above was described for a straight transverse seam across the superposed pairs of thermoplastic films, the method may be employed to make irregular shaped articles, the shape being determined solely by the path of movement of the electrodes relative to the superposed films, for instance, the present method is extremely useful for making gloves or other irregularly shaped articles out of thermoplastic film. In practicing such a method, the electrodes will be moved relative to the superposed pairs of thermoplastic films in a path of movement defining the contour of a glove. The resulting product will have an extremely fine seam along the periphery thereof, there being no skirt or marginal portions left, as might be required if such an irregularly shaped article were made in accordance with the prior art.

Close observation indicates that at no time does the electrical discharge actually pass through the thermoplastic material but, instead, passes through the slit defined by the separation effected by the heat of the electrical discharge. Specifically, the electrical discharge passes through the slit at its most advanced point to heat the thermoplastic material immediately in advance of it to thus seal it and separate it. Accordingly, as the electrical discharge is advanced the slit defined by the separated material will also advance.

From the foregoing it will be seen that it is desirable to strike the electrical discharge near an edge of the material rather than causing an electro-perforation thereof. The latter, of course, requires substantially higher voltage than is necessary if air alone resists the discharge. By "an edge of the material" is meant any portion adjacent a void and not only the peripheral edge of the material. For instance, if the thermoplastic material is provided with a small hole, the electrical discharge, whether arc or spark, would pass relatively readily therethrough. Accordingly, the material surrounding the hole would constitute an edge as the term is used herein.

While the present method finds its greatest utility in simultaneously sealing and cutting superposed layers of thermoplastic material, the method described may be used in lieu of a knife to cut a single layer of thermoplastic film between electrodes, there can be no sealing as would occur when superposed pairs of thermoplastic films are employed, and the only effect which the passage of the electrical discharge such as an arc or a spark will have, will be that of cutting the single layer.

*The Apparatus*

A fuller understanding of the present invention may be had from a description of apparatus for making bags out of thermoplastic film material. This description is presented herein to illustrate the above described method as well as to describe in detail one form of apparatus suitable for working said method. However, it will be understood that the present invention may be incorporated in other types of apparatus without departing from the spirit and scope of the invention.

Referring now to FIG. 1 in detail, the reference numeral 10 generally designates a machine or apparatus for making bags from thin wall thermoplastic tubing such as extruded polyethylene tubing. Such tubing is extremely flaccid and is normally handled in a flattened condition whereby the tubing may be said to consist of two superposed layers of the thermoplastic film or thin sheet which are integrally joined at the longitudinal edges thereof. Generally, such tubing is obtained in large rolls such as the roll 12 rotatably mounted on an axle 13 as shown in FIG. 1.

The apparatus 10 comprises a support table 14 around which is disposed the flattened thermoplastic tubing 16 after it has been unwound from roll 12. Tubing 16 has an upper layer 18 disposed above the upper surface of table 14 and a layer 20 disposed below the bottom surface of table 14. The upper surface of table 14 is provided with a pair of longitudinally extending spaced grooves 22 and 24, into which extends a pair of sharp blades 26 and 28 respectively. Blades 26 and 28 are supported by a suitable support structure 30 and are secured thereto in any suitable manner such as by a screw, rivet or other securing element 32. Provided in the lower surface of table 14 and between the two upper grooves 22 and 24 is a single longitudinally extending groove 29 into which extends a knife blade 31 mounted on a support structure 33 as by a securing element 35. Support structures 30 and 33 may, in fact, be separate parts of the same structure. Also provided on the support table 14 for reasons which will becomes more clear hereinafter, is a vertically extending member 34 which is generally formed integrally with the table 14, although it may be a separate piece connected thereto. Preferably, vertically extending member 34 which extends above the upper surface of table 14 and below the lower surface, thereof is V-shaped with the apex of the V facing the blades 26 and 28. To feed the thermoplastic tube through the apparatus in a manner to be described hereinafter, a pair of closely spaced feed or drive rollers 36 and 38 are provided. Feed roller 36 is mounted on shaft 40 which is connected to the output shaft of a motor FM by any suitable means. Also mounted on shaft 40 is a spur gear 42 which is in meshed relation with idler gear 44, which in turn is in meshed relation with a second idler gear 46. Idler gear 46 is in meshed relation with a spur gear 48 mounted on the shaft 50. Driver roller 38 is also mounted on the shaft 50. As will be described hereinafter, feed motor FM is intermittently energized to intermittently advance tube 16 through the apparatus.

Apparatus 10 further includes our novel means for simultaneously cutting and sealing the thermoplastic material. As shown in FIGS. 1 and 7, this means is generally designated by the reference numeral 52. Sealing and cutting means 52 comprises a stationary frame 53 including two spaced horizontal members 54 and 56, which are held in vertically spaced relation by two vertically extending members 58 and 60. Member 56, as shown herein, is channel shaped in section (see FIG. 1) and mounted in said channel but extending below is a pinion 70 carried by a shaft 72 which is the output shaft of a second motor TM. Disposed below pinion 70 is a horizontal bar 74 which is connected to horizontal bar 64 by two rigid vertically extending members 76 and 78 to define a movable frame 79. Provided in the upper surface of bar 74 is a multiplicity of rack teeth 80 which are in meshed relation with pinion 70 so that when motor TM is energized to rotate in one direction, frame 79 will move in one direction under the driving impetus of the rack teeth 80 and the pinion 70, and when motor TM is energized in the opposite direction, frame 79 will move in the opposite direction. Fixed to lower bar 74 is a pair of upstanding electrodes 82 and 84 which are aligned with but spaced from electrodes 66 and 68, respectively. Both electrodes 82 and 84 extend through a slot 85 in the top of channel 56 with clearance to permit movement of the electrodes. The opposed electrodes 66 and 82 and 68 and 84 are adapted to be energized by a suitable electrical energy source so as to cause electrical discharge to pass between the associated pairs of electrodes. As shown in FIG. 1, the energy source comprises a D.C. source such as a battery B, although a rectified alternating current source may be employed, a current limiting resistor CR and a capacitor C, the plates of which are connected to the opposed electrodes in each pair. With such an energizing circuit arrangement, the capacitor C will tend to charge up to the voltage of the D.C. source BB, which voltage is greater than the breakdown voltage between the opposed electrodes. Therefore, a spark will pass between the electrodes to thus discharge the capacitor C which will cause the discharge to stop. As soon as the discharge terminates, the capacitor C will again recharge and upon recharging to the breakdown voltage, a second spark will pass between the opposed electrodes. This sequence of events takes place with extreme rapidity, so that, as mentioned earlier in this specification, the series of sparks seem to be continuous, although they are intermittent at extremely close time intervals. To govern the energizing of the electrodes, a switch S is included in the capacitor charging circuit.

While the voltage source described above is adapted to cause a sparking between the electrodes, it will be obvious that as has been indicated hereinbefore, arcing may be used as a satisfactory medium for sealing and cutting superposed thermoplastic films. If this form of sealing and cutting is elected then, of course, it will be necessary to alter the voltage source so that it provides a voltage sufficient to maintain a constant discharge and not the pulsating voltage supplied by the capacitor C as described above.

Regardless of which form of voltage source is employed, as indicated hereinbefore it is necessary to hold the thermoplastic film out of engaging relation with the electrodes. To perform this function in apparatus 10, a table 87 disposed between apparatus 52 and the drive rollers acts to position the tube for passage with clearance through the space between the electrodes and a relatively short table 89 is provided on the opposite side of the sealing and cutting apparatus 52. The upper surfaces of the tables 87 and 89 are coplanar and the plane of these upper surfaces passes midway between the electrodes.

Apparatus 10 operates as follows: Tube 16, which is wound into roll 12 which is rotatably mounted on axle 13, is fed through the apparatus so that the upper layer 18 is on top of table 14 and the lower layer 20 is underneath it. As the tube is moved past the blades 26, 28 and 29, longitudinal cuts are made in the tube 16, two closely spaced cuts in the upper surface and a single central cut in the lower surface. These cuts divide the single tube 18 into two longitudinally extending U-shaped tube portions 86 and 88 with the two legs of each U-shaped portion being horizontal and with the lower legs 90 and 92 respectively of each U-shaped portion being longer than the upper leg 94 and 96, respectively. The central ribbon removed from the upper surface 18 of tube 16 by the spaced blades 26 and 28 may be wound up into a roll 98 on an intermittently rotating shaft 100. The two separate tube portions are spaced apart by the vertically extending member 34, and both U-shaped tube portions pass between the drive rollers 36 and 38 which impart movement in a longitudinal direction to the thermoplastic material. The feed rollers 36 and 38 also operate to bring the upper and lower layers of each U-shaped portion back into surface-to-surface relation and hence condition them for sealing and cutting by apparatus 52. As will be shown in FIG. 1, the sealing and cutting takes place along the path of movement of the electrodes projected onto the thermoplastic material. As will be described in more detail hereinafter, the pair of electrodes 68 and 84 when in their extreme left hand positions, as shown in solid lines in FIG. 7, are disposed in line with the spacing between the right hand U-shaped tube portion 86 and the left hand U-shaped tube portion 88. Moreover, the left hand pair of electrodes 66 and 82, when in their extreme left hand positions as shown in solid lines in FIG. 7 are disposed just to the left of the left hand edge of the left hand U-shaped tube portion 88. Accordingly, in the extreme left hand position, only air separates each opposed pair of electrodes. When the tube portions are disposed between the electrodes, and the electrodes are in their extreme left hand position, as shown in solid lines in FIG. 7, the switch S controlling the energization of the electrodes can be closed to cause sparking between each pair of electrodes. Thereafter, motor TM may be energized to move the two pairs of electrodes to the right to traverse in a direction perpendicular to the longitudinal axis of the tube portions, and to thus seal two seams 102 and 104 and to cut the material along those seams. Thereafter, the material may be advanced to a distance equal to the desired width of the bags, and the electrodes may be moved from their right hand positions shown in dotted lines in FIG. 7 back to the left hand positions by a reverse operation of motor TM to define another pair of seams. The second movement will sever two separate bags 106 and 108 from the remaining stock, which bags may drop into a receptacle for storage and subsequent shipment. At the same time, one side seam of two additional bags is formed.

Apparatus 10 includes control means for coordinating the movement of the opposed pairs of electrodes with the advancing of the tube stock by the feed rollers 36 and 38. This control apparatus is shown in FIG. 8 and includes a manually operable master switch MS, a pair of limit switches LSL and LSR, a cam 110 mounted by the output shaft 112 of the motor FM, and a pair of control relays R1 and R2. Limit switch LSL is mounted on stationary frame 53 and is associated with the movable electrode carrying frame 79 and is in its normal condition shown in solid lines in FIG. 8, except when the movable frame 79 is in its extreme left hand position in which position the limit switch LSR operates to the dotted line position shown in FIG. 8. Associated with cam 110 having a raised cam portion 114 is a pair of cam operated switches CS1 and CS2, which are located on diametrically opposite sides of the cam 110. Both switches CS1 and CS2 are normally open and are closed only when the cam portion 114 engages them to move them into the closed position. The rotation of shaft 112 through 180° is equivalent to the advancing of the thermoplastic stock a distance equal to the desired width of the bags 106 and 108. Shaft 112, which drives cam 110, is coupled to the output shaft of motor FM by any suitable drive means, preferably an adjustable drive means, whereby apparatus 10 can be adjusted to make bags of different widths. As shown in FIG. 8, the energy source for the control apparatus is a battery LB, although any suitable electrical energy source may be employed in lieu thereof. Battery LB is provided with a positive terminal B and a negative terminal N.

The energizing circuit for relay R1 may be traced from the positive terminal B of battery LB, over the normally closed contact of limit switch LSL, over cam switch CS1 and through the winding of relay R1 to negative terminal N of battery LB. The energizing circuit for relay R2 may be traced from positive terminal B of battery LB, over master switch MS, the normally closed contact of limit switch LSR, cam switch CS2, and through the winding of relay R2 to negative terminal N of battery LB. A first energizing circuit for the feed motor FM, which drives feed rollers 36 and 38 to advance the thermoplastic material through apparatus 10 may be traced from positive terminal B of battery LB, over the master switch MS, the normally open contact of limit switch LSL, the winding of motor FM, back contact $a$ of relay R1, and back contact $a$ of relay R2 to the negative terminal N of battery LB. A second energizing circuit for motor FM may be traced from positive terminal B of battery LB, over master switch MS, the normally open contact of limit switch LSR, the winding of motor FM, back contact $a$ of relay R1, and back contact $a$ of relay R2 to the negative terminal end of battery LB. Motor TM is provided with two energizing circuits which are adapted to energize the motor with opposite polarities to thus cause it to rotate in one direction when it is energized with one polarity, and in the opposite direction when it is energized with the opposite polarity so as to cause the electrode carrying frame 79 to move back and forth in the aforedescribed manner. Assuming the initial position to be the extreme left hand position for the electrode carrying frame 79 to energize traverse motor TM so as to cause the frame 79 to move to the right, an energizing circuit is provided which may be traced from positive terminal B of battery LB, over front contact $b$ of relay R1, through the winding of motor TM from right to left, as viewed in FIG. 8, and over front contact $c$ of relay R1 to the negative terminal end of battery LB. To energize motor TM in the opposite direction so as to cause the electrode carrying frame 79 to move from right to left, a second energizing circuit is provided which may be traced from the positive terminal B of battery LB, over front contact $b$ of relay R2, through the winding of motor TM from left to right and over front contact $c$ of relay R2 to the negative terminal end of battery LB.

Having described the component parts of apparatus 10 in detail, the operation thereof will now be described. Tube 16 may be manually fed over the table 14 past the vertical member 34 and through the feed rollers 38 to condition the tube for automatic feeding and cutting, as will be described. Let it be assumed that in the initial condition of the apparatus, master switch MS and control switch S are open so that all electrical apparatus is de-energized, and the electrode carrying frame 79 is in its extreme left hand or solid line position, as shown in FIG. 7. In such a condition, the raised cam portion 114 of cam 110 is in engagement with cam switch CS1 to close said switch, limit switch LSL is in its normal position shown in solid lines in FIG. 8, and limit switch LSR is out of its normal position and in its dotted line position, as shown in FIG. 8. With master switch MS open, both relays R1 and R2 are de-energized to thereby open both energizing circuits for traverse motor TM. Moreover, with the limit switches in the described condition, motor FM is also de-energized. The apparatus is actuated by first closing switch S to cause a spark to commence passing between each pair of opposed electrodes and thereafter, master switch MS is closed. As soon as master switch MS is closed, the energizing circuit for relay R1 becomes closed to cause that relay to pick up to maintain the feed motor energizing circuit open at back contact $a$ of relay R1 and to close the energizing circuit for the traverse motor of such polarity that the traverse motor will rotate to move the electrode carrying frame from left to right, as viewed in FIG. 7. As soon as the frame moves out of its extreme left hand position, limit switch LSR operates to its normal condition, shown in dotted lines in FIG. 8, but this has no immediate effect on the apparatus. Traverse motor TM continues to operate until the electrode frame 79 is moved into its extreme right hand position at which point limit switch LSL is moved out of its normal position into its dotted line position to thus open the energizing circuit for relay R1 and cause that relay to release. With sparks passing between electrodes in rapid succession, seams 102 and 104 will be sealed and cut as the electrodes move over and under the thermoplastic material as described heretofore. The release of relay R1 opens the previously closed energizing circuit for traverse motor TM to thus de-energize motor TM and hold the electrode frame stationary in its extreme right hand position, as shown in dotted lines in FIG. 7. Moreover, upon relay R1 releasing one of the energizing circuits for feed motor FM will be closed, which energizing circuit has been previously traced and includes the normally open contact of limit switch LSL. Accordingly, feed motor FM will commence operating to rotate the feed rollers 36 and 38 and thus advance the thermoplastic material. At the same time, the operation of feed motor FM will cause ram 110 to rotate out of engagement with cam switch CS1 to cause that switch to open, and when the stock has been advanced the desired distance depending upon the desired width of the bags 106 and 108, cam 110 will rotate into engagement with cam switch CS2 to close the previously traced energizing circuit for relay R2, which will pick up and thus open the energizing circuit for feed motor FM to discontinue the feed of the stock. Moreover, upon relay R2 picking up, the previously traced reverse polarity energizing circuit for traverse motor TM including front contacts $b$ and $c$ of relay R2 will become closed to cause motor TM to rotate in the opposite direction, and hence move the electrode carrying frame from the extreme right hand (dotted line) position in FIG. 7 back to the extreme left hand position to seal and cut the thermoplastic material along a second line. As the frame moves out of the extreme right hand position, limit switch LSL operates back to its normal position, but this has no immediate effect on the apparatus, since the circuit including this contact is open at cam switch CS1. However, as the electrode frame moves into the extreme left hand position, limit switch LSR is operated from its normal (solid line) position to its other position to thus open the energizing circuit for relay R2 to cause that relay to release and open the reverse polarity energizing circuit for traverse motor TM. This second move of the electrodes across the thermoplastic stock will make a second seam on each of the two bags 106 and 108 to thus produce a pair of bags which are closed on three sides and have a fourth open side having a flap 116 therein. As the right to left movement is completed, the second energizing circuit for the feed motor FM will be closed over the normally open contact of limit switch LSR to cause the feed motor to again operate the feed rollers 36 and 38 and again advance the stock. At the same time, of course, cam 110 will be rotated to cause cam portion 114 to disengage itself from cam switch CS2 and finally, to engage cam switch CS1 at which point relay R1 will pick up and the apparatus is restored to its initial condition and is again in condition to repeat the above described cycle.

Referring now to FIG. 9, a modified form of sealing apparatus generally designated by the reference numeral 120 is illustrated. This apparatus includes a fixed frame 122 made up of inverted channel 124, two fixed vertical members 126 and 128, and a rod 130, preferably made of any suitable insulating material such as, for instance, polytetrafluoroethylene or polytrifluorochloroethylene. These insulating materials are given by way of example, and not by way of limitation.

The insulating rod 130 is provided along the upper elements thereof with a notch 132, here shown as V-shaped, although other forms of notches may be employed. Disposed within the notch 132 is a longitudinally extending wire 134 having a horizontally spaced end terminal 136 adapted to be connected to one terminal of a source of high voltage such as one terminal of the capacitor C. In such manner, wire 134 functions as one of the electrodes between which an electrical discharge passes to seal and cut thermoplastic material. The wire 134 is disposed in the notch 132 in order to space the wire from the thermoplastic sheet material which will ride over the notch in vertically spaced relation with the wire 134.

Mounted on the inverted channel 124 is a rotatable shaft 138, on which is fixed a pinion 140. Shaft 138 is operatively connected to the output shaft of the motor TM. Pinion 140 is in meshed relation with a rack 142 which has fixed thereto a pair of electrodes 144 and 146. Motor TM is controlled by the same apparatus illustrated in FIG. 8 or by other control apparatus which can perform the same functions in the same time relationship as the apparatus shown in FIG. 8, whereby to periodically move the rack 142 and the spaced electrodes 144 and 146 from and to the left hand position shown in solid lines, and to and from the right hand position shown in dotted lines in FIG. 9. When using the electrode construction described immediately above, in view of the fact that the insulating rod 130 acts to support the thermoplastic film in spaced relation with wire 134 and electrodes 144 and 146, table surfaces 87 and 89 as shown in FIG. 1 may be dispensed with as the insulating rod 130 performs the function of these two table surfaces.

Apparatus 120 may be substituted in machine 10 for the apparatus generally designated in FIG. 1 by the reference numeral 52. The operation of machine 10 will be exactly the same as that described above, and the movement of electrodes 144 and 146 will be the same as the movement of electrodes 66 and 68. However, with apparatus 120, there need be no movement of wire 134, as it extends the full length of the frame 122 and hence is always immediately below the tips of the electrodes 144 and 146. In view of the description of the operation of machine 10 containing sealing and cutting apparatus 52, it is deemed unnecessary to repeat the description of the operation of machine 10 when sealing and cutting apparatus 120 is substituted for apparatus 52.

Although we have herein shown and described several forms of the present invention and have suggested various changes and modifications therein, other changes and modifications may be made therein within the scope of the appended claims without departing from the spirit and scope of this invention.

What we claim is:

1. The method of simultaneously making two bags from a flaccid tube of thermoplastic material which is normally collapsed so that it is in the form of two superposed layers joined at the longitudinal edges thereof, comprising the steps of cutting a portion of both said layers in a longitudinal direction and between the longitudinal edges thereof to define two longitudinally extending tube portions, moving said tube portions relative to one another in a transverse direction to space them from one another, advancing said tube portions longitudinally, and then passing an electrical spark close to an edge of said superposed layers to heat said layers adjacent said edge to cause them to weld together and to separate along said weld, and advancing said electrical spark relative to said collapsed tube and transversely thereof along a second transverse line which is spaced from said first mentioned transverse line along the longitudinal axis of said tube.

2. Apparatus for sealing and cutting thin walled tubing of thermoplastic material at predetermined longitudinal distances, said tubing being flaccid and normally lying in a collapsed condition so that it forms two superposed layers of thermoplastic film integrally joined at their outer edges, said apparatus comprising means for advancing said tubing in a longitudinal direction, a pair of vertically spaced electrodes, said tubing being adapted to pass between said electrodes with clearance, at least one of said electrodes being movable laterally of said tubing to and from a first and second extreme position, said electrodes being connected to a source of voltage greater than the breakdown voltage therebetween, a first motor means for operating said tube advancing means, and a second motor means for operating said electrode moving means, means for energizing said first motor means to advance said tubing, means for de-energizing said first motor when said tubing has advanced said predetermined distance, means for energizing said second motor when said first motor is de-energized to move said electrode from its first extreme position to its second extreme position, means for de-energizing said second motor when said electrode assumes said second extreme position, means for re-energizing said first motor means upon the de-energization of said second motor means to again advance said tubing, means for again de-energizing said first motor means when said tubing has again been advanced said predetermined distance, and means for re-energizing said second motor means upon the de-energization of said first motor means to move said electrode from said second extreme position to said first extreme position.

3. Apparatus for making bags of predetermined width out of thin walled tubing of thermoplastic material, said tubing being flaccid and normally lying in a collapsed condition so that it forms two superposed layers of thermoplastic film integrally joined at their outer edges, said apparatus comprising means for advancing said tubing in a longitudinal direction, means for cutting a central strip out of one of said layers, means for bisecting said other layer whereby to divide said tubing into two edge-to-edge tube portions, means adapted to engage the confronting edges of said two tube portions for spacing them from one another, two pairs of vertically aligned electrode means, each pair of electrode means having a movable vertically extending electrode adapted to be associated with one of said tube portions, said movable electrodes being horizontally spaced apart a slight distance greater than the width of said tube portions and being movable to and from first extreme positions in which one of said movable electrodes projects beyond the outer edge of its associated tube portion and the other of said movable electrodes is aligned with the space between said confronting edges of said two tube portions and to and from second extreme positions in which said one movable electrode is aligned with the space between said confronting edges of said two tube portions and the other of said electrodes projects beyond the outer edge of its associated tube portion, each pair of electrodes being connected to a source of voltage greater than the breakdown voltage therebetween, a first motor means for operating said tube advancing means, and a second motor means for moving said movable electrodes in unison to and from their first and second extreme positions, means for energizing said first motor means to advance said tubing, means for de-energizing said first motor when said tubing has advanced said predetermined width, means for energizing said second motor when said first motor is de-energized to move said electrodes from their first extreme positions to their second extreme positions, means for de-energizing said second motor when said electrodes assume said second extreme positions, means for re-energizing said first motor means upon the de-energization of said second motor means to again advance said tubing, means for again de-energizing said first motor means when said tubing has again been advanced said predetermined width, and means for re-energizing said second motor means upon the de-energization of said first motor means to move said electrodes from said second extreme positions to said first extreme positions.

4. Apparatus for cutting and sealing a pair of superposed layers of thermoplastic film, comprising a pair of spaced electrodes, electrical supply means connected to said electrodes for supplying thereto a pulsating direct current voltage periodically greater than the breakdown voltage therebetween whereby to cause an electrical discharge to pass therebetween, means for positioning said superposed layers between said electrodes in spaced relation therewith, and means for moving at least one of said electrodes relative to said thermoplastic layers, one of said electrodes being a longitudinally extending member connected to said electrode moving means for movement thereby, the other of said pair of electrodes being a continuous conductor extending along the projected path of movement of said one electrode.

5. Apparatus for cutting and sealing a pair of superposed layers of thermoplastic film, comprising a pair of spaced electrodes, electrical supply means connected to said electrodes for supplying thereto a pulsating direct current voltage periodically greater than the breakdown voltage therebetween whereby to cause an electrical discharge to pass therebetween, means for positioning said superposed layers between said electrodes in spaced relation therewith, and means for moving at least one of said electrodes relative to said thermoplastic layers, one of said pair of electrodes being a longitudinally extending pointed member operatively connected to said electrode moving means for movement thereby and the other of said electrodes being a wire extending along the projected path of movement of said one electrode, an insulating member having a longitudinally extending groove of greater depth than the thickness of said wire, said wire being disposed within said groove to prevent said thermoplastic material from contacting said wire.

6. Apparatus for cutting and sealing a pair of superposed layers of thermoplastic film, comprising a pair of spaced electrodes, electrical supply means connected to said electrodes for supplying thereto a pulsating direct current voltage periodically greater than the breakdown voltage therebetween whereby to cause an electrical discharge to pass therebetween, means for positioning said superposed layers between said electrodes in spaced relation therewith, and means for moving at least one of said electrodes relative to said thermoplastic layers, said pair of electrodes being in vertical alignment, the upper one of said electrodes being a vertically extending pointed member operatively connected to said means for moving said electrodes for movement thereby, the lower of said electrodes being a wire extending along the projected path of movement of the point of said upper electrode, and a rod of insulating material having a longitudinally extending notch in its upper surface of greater depth than the thickness of said wire, said wire being disposed within said notch, said rod being adapted to support said thermoplastic material out of engaging relation with said wire.

7. Apparatus for cutting and sealing a pair of superposed layers of thermoplastic film, comprising a pair of spaced electrodes, electrical supply means connected to said electrodes for supplying thereto a voltage greater than the breakdown voltage therebetween whereby to cause an electrical discharge to pass therebetween, means for positioning said superposed layers between said electrodes in spaced relation therewith, and means for moving one of said electrodes relative to said thermoplastic layers while keeping the other of said electrodes stationary relative to said thermoplastic layers, said one electrode being a member connected to said electrode moving means for movement thereby, the other of said pair of electrodes being an electrically continuous conductor extending along the projected path of movement of said one electrode.

8. Apparatus for cutting and sealing a pair of superposed layers of thermoplastic film, comprising a pair of spaced electrodes, electrical supply means connected to said electrodes for supplying thereto a voltage periodically greater than the breakdown voltage therebetween whereby to cause an electrical discharge to pass periodically therebetween, means for positioning said superposed layers between said electrodes in spaced relation therewith, and means for moving one of said electrodes relative to said thermoplastic layers, while keeping the other of said electrodes stationary relative to said thermoplastic layers, said one electrode being a member connected to said electrode moving means for movement thereby, the other of said pair of electrodes being an electrically continuous conductor extending along the projected path of movement of said one electrode.

References Cited in the file of this patent

UNITED STATES PATENTS

| | | |
|---|---|---|
| 2,248,057 | Bond | July 8, 1941 |
| 2,365,576 | Meaker et al. | Dec. 19, 1944 |
| 2,444,685 | Waters | July 6, 1948 |
| 2,553,203 | Monty | May 15, 1951 |
| 2,592,463 | Phillips | Apr. 8, 1952 |
| 2,628,412 | Vera | Feb. 17, 1953 |
| 2,698,046 | Finke | Dec. 28, 1954 |
| 2,711,779 | Carland | June 28, 1955 |
| 2,726,706 | Hakomaki | Dec. 13, 1955 |
| 2,763,759 | Mito | Sept. 18, 1956 |
| 2,884,988 | D'Angelo | May 5, 1959 |